(No Model.)
S. PARKS.
DRAFT BAR FOR VEHICLES.
No. 562,970. Patented June 30, 1896.
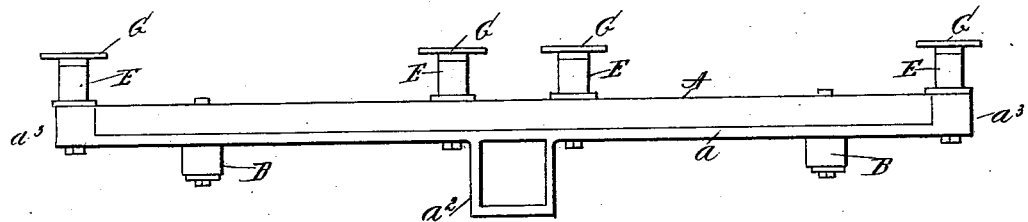
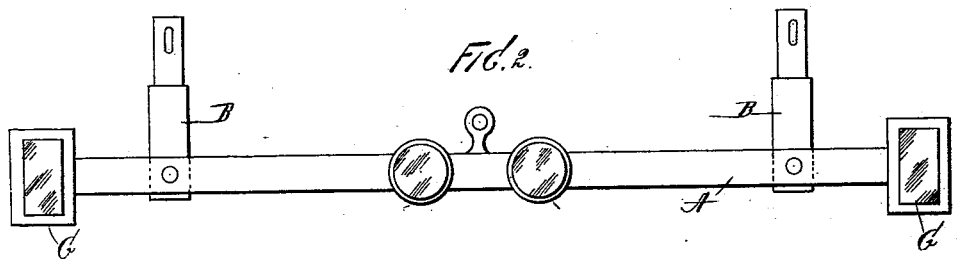
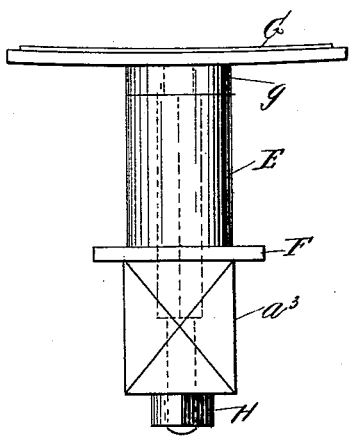
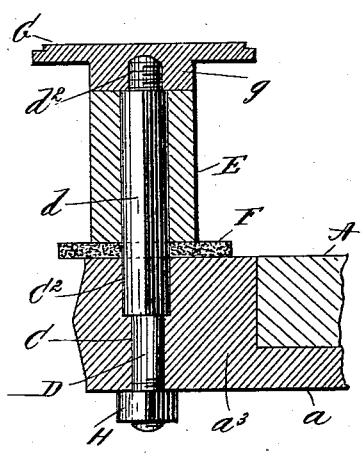
WITNESSES:
John Buckler
C. Gersh
INVENTOR
Samuel Parks,
BY
Edgar Tate & Co
ATTORNEYS.

UNITED STATES PATENT OFFICE.

SAMUEL PARKS, OF NEW YORK, N. Y.

DRAFT-BAR FOR VEHICLES.

SPECIFICATION forming part of Letters Patent No. 562,970, dated June 30, 1896.

Application filed January 3, 1896. Serial No. 574,251. (No model.)

*To all whom it may concern:*

Be it known that I, SAMUEL PARKS, a subject of the Queen of Great Britain, and a resident of New York, in the county of New York and State of New York, have invented certain new and useful Improvements in Draft-Bars, of which the following is a specification, reference being had to the accompanying drawings, forming a part thereof, in which similar letters of reference indicate corresponding parts.

The object of this invention is to provide improved pull-blocks for the pull-bars of carriages and similar vehicles, which are so constructed and arranged that the traces of the harness may be removed therefrom, or disconnected therewith, while under great strain, a further object being to provide means whereby the traces of a harness may be disconnected from the pull-bar of a carriage or similar vehicle if the horse or horses, when hitched thereto, should fall, thus placing the traces under great strain; and with these and other objects in view the invention consists in the construction, combination, and arrangement of parts hereinafter described and claimed.

The invention is fully disclosed in the following specification, of which the accompanying drawings form a part, in which—

Figure 1 is a front view of the pull-bar of a carriage or similar vehicle provided with my improved pull-blocks connected therewith; Fig. 2, a plan view thereof; Fig. 3, an end view, and Fig. 4 a central vertical section of one of the pull-blocks and a portion of the pull-bar.

In the drawings forming part of this specification, A represents the pull-bar of a carriage or similar vehicle which is preferably provided with a metal plate $a$, which is secured to the bottom thereof, and which is provided centrally with a depending yoke $a^2$ or other device by which it may be connected with the corresponding bar or tongue, (not shown,) which, in practice, is secured to the front axle of the vehicle, and the plate $a$ is also preferably provided at each end with upwardly-directed shoulders or projections $a^3$, and connected therewith, near each end thereof, are backwardly-directed arms or bars B, which are also connected with the front axle or part of the running-gear of the vehicle in the usual manner.

Formed in each of the upwardly-directed shoulders or projections $a^3$ is a central vertical bore C, through which passes a bolt D, and the upper portion of the bore C is enlarged, as shown at $C^2$, and the upper portion of the bolt D is correspondingly enlarged, as shown at $d$, and mounted on the enlarged portion of the bolt D is a tubular head E, below which is preferably placed a washer F, and the tubular head E is held upon the upper portion of the bolt D by means of a cap G, which is provided on its under surface and centrally thereof with a depending cylindrical portion $g$, in which is formed a screw-threaded bore, into which a screw-threaded shank $d^2$, on the upper end of the bolt D, is adapted to enter. The bolt D is also provided at its lower end with a nut H, and may be removed from the head $a^3$ whenever desired, by removing said nut. It will be observed that one of these devices is connected with each end of the pull-bar A, and also that two thereof are secured to the middle portion of said pull-bar, as shown in Figs. 1 and 2, and the operation will be readily understood from the foregoing description when taken in connection with the accompanying drawings. If a horse should fall when hitched to a carriage or other vehicle provided with my improvement, the traces may readily be disconnected from the pull-bar or the pull-blocks connected therewith, by unscrewing the cap G and slipping the traces off of the tubular heads E, and this operation may be easily and quickly performed, regardless of the manner in which, or means by which, the traces are connected with the pull-blocks.

It is well known that if a horse, when hitched to a carriage or other vehicle, should fall, it is frequently necessary to disconnect the horse from the carriage before the former can regain its feet, and by means of this arrangement this connection may be easily and quickly made without cutting the traces or otherwise injuring the harness.

If desired, the pull-bar may be made entirely of one piece, and other changes in and modifications of the construction herein described may be made without departing from the spirit of my invention or sacrificing its advantages.

Having fully described my invention, I claim as new and desire to secure by Letters Patent—

The combination with the draw-bar of a carriage or similar vehicle, of a metal plate $a$ secured to the under side thereof, and provided with a central depending frame $a^2$ and an upwardly-directed projection or shoulder at the ends thereof, provided with a central bore C, the upper portion of which is enlarged, of attaching devices secured to said draw-bar adapted to receive the traces, said devices consisting of a bolt D, the lower end of which is adapted to enter the bore C in the projection $a^3$, the upper end of said bolt being enlarged to correspond with the diameter of the upper portion of the bore C, and a nut H on the restricted portion of said bolt, a tubular head or spool E mounted on said bolt, a washer F between the projections $a^3$ and the lower end of said spool the upper end $d^2$ of said bolt being reduced and provided with screw-threads, and cap G provided with a depending central projection $g$ having a central interiorly-screw-threaded bore adapted to be secured upon the end of said bolt, whereby the cap may be removed, and the traces may be slipped off of the tubular head E or said head may be removed with the traces and similar attaching devices near the center of the draw-bar as and for the purpose set forth.

In testimony that I claim the foregoing as my invention I have signed my name, in presence of the subscribing witnesses, this 31st day of December, 1895.

SAMUEL PARKS.

Witnesses:
THOMAS PARKS,
A. W. MEAD.